Jan. 29, 1963   B. BARENYI   3,075,604
MOTOR VEHICLE WITH LARGE LOADING PLATFORM
Filed Feb. 13, 1958
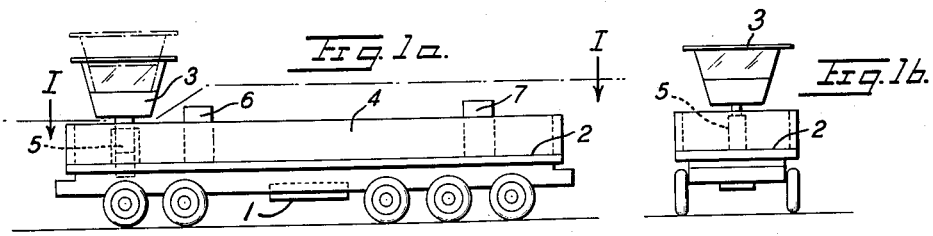
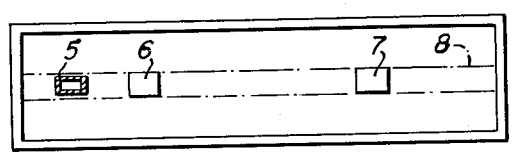
INVENTOR
BELA BARENYI
BY Dicke and Craig
ATTORNEYS.

United States Patent Office 3,075,604
Patented Jan. 29, 1963

3,075,604
MOTOR VEHICLE WITH LARGE LOADING
PLATFORM
Bela Barenyi, Stuttgart-Vaihingen, Germany, assignor to
Daimler-Benz Aktiengesellschaft, Stuttgart-Unterturkheim, Germany
Filed Feb. 13, 1958, Ser. No. 715,086
Claims priority, application Germany Feb. 16, 1957
1 Claim. (Cl. 180—89)

The present invention relates to a motor vehicle, and more particularly to a commercial type motor vehicle with an engine disposed below the loading platform and with a driver cab arranged above the same and at a distance therefrom.

The present invention aims at providing with such types of motor vehicles a loading platform suitable particularly for long objects or goods to be transported thereby in which as little as possible of the loading space is taken up by the driver cab.

A problem present in prior art constructions which the present application seeks to resolve consists in protecting the support members or columns carrying the driver cab against damages by the payload, particularly if the latter are relatively long.

Motor vehicles are known in the prior art in which, for purposes of increasing the loading surface, the driver cab is secured above the loading surface by means of a support pedestal and a flange. However, these prior art type constructions did not render it possible, especially with very long objects of the payload, to utilize the entire surface of the motor vehicle with only slight or no losses at all in the loading surface. Furthermore, in these prior art devices, the support member or pedestal for the driver cab is not so constructed and arranged as to prevent damage thereof by the objects to be transported which extend over the entire loading surface if, for example, the objects displace themselves or move while placed on the loading surface for instance, during travel.

The present invention serves to eliminate the aforementioned disadvantages of the prior art devices, and essentially consists in that the driver cab is supported on one support column which is protected at least partly against damage by the transported goods by a special arrangement of additional means which have relatively small cross section.

In the preferred embodiment according to the present invention, a single support column is provided which is arranged in the longitudinal center plane of the vehicle and which has a rectangular cross section with only a slight dimension in the transverse direction of the vehicle. For purposes of protection of the support column against damage by the transported goods, at least one pillar or post, preferably having a rectangular cross section, is arranged in the longitudinal center plane of the vehicle. The pillar or post preferably has a larger width than the support member. If the payload is secured at this one post or at the two posts, if two such posts are provided, or is kept fixed with respect thereto, then the support member or column cannot be damaged by the transported goods because the pillars are wider than the support member. One pillar already provides a certain protection against damages.

Accordingly, it is an object of the present invention to provide a motor vehicle capable of transporting relatively long objects, such as rails, bearer members, etc.

It is another object of the present invention to provide a commercial type vehicle having a relatively large loading platform in which the loading surface is decreased as little as possible by the support members for the driver cab.

Still another object of the present invention is the provision of a motor vehicle having a relatively large loading platform so as to be able to transport relatively long objects in which the support members or columns for the driver cab are protected against damage by the payload consisting, for example, of relatively long objects when the latter move during transportation or standstill of the vehicle.

A further object of the present invention is the provision of a support for the driver cab of a vehicle adapted to transport relatively long objects by means of which the driver cab is rigidly supported, yet enables an optimum utilization of the loading platform and surface therefor while simultaneously protecting the support members either by special means or by the vehicle superstructures consisting, for example, of the side walls and/or front and rear end walls thereof.

These and further objects, features and advantages will become more obvious from the following description when taken in connection with the accompanying drawing, which shows, for purposes of illustration only, several embodiments in accordance with the present invention, and wherein:

FIGURE 1a is a side view of a motor vehicle in accordance with the present invention;

FIGURE 1b is an end view of the vehicle shown in FIGURE 1a with certain parts thereof omitted for purposes of clarity; and FIGURE 1c is a plan view taken along line I—I of FIGURE 1a.

Referring now to the drawing, wherein like reference numerals are used throughout the various views to designate like parts, reference numeral 1 designates therein the engine which is disposed below the loading surface 2 and is arranged approximately in the center of the vehicle. The driver cab 3 is disposed so far above the loading surface 2 that long objects 4, for example, rails, masts, columns, support members, tubular members, round timber, etc., may also be placed therebelow. The driver cab 3 is carried by a single support member or column 5 which may be telescoped upwardly in the illustrated embodiment by appropriately providing two telescoping parts.

Two pillars 6 and 7 are arranged in the central longitudinal plane of the vehicle behind the support column 5 which pillars 6 and 7 are slightly larger in width than the support column 5. If the payload consisting, for example, of objects to be transported which extend over the entire length of the vehicle are secured at the two pillars 6 and 7 or if the objects to be transported during travel roll thereagainst, nonetheless, they cannot come into contact with the support column 5. The longitudinal strip 8 shown in FIGURE 1c in the center thereof which corresponds to the width of the pillars 6 and 7 indicates the loss of loading surface which arises in connection with a construction of the support member during loading of the relatively long objects. The loss in loading surface in this case amounts to approximately ten percent.

The driver cab may be of any suitable construction provided with windows, doors, etc., and with means such as steps or a ladder to enable the driver to enter the driver cab. All controls for the vehicle are arranged in the driver cab as is conventional.

The side wall superstructure surrounding the loading platform may also be of suitable construction, such as, for example, of double-walled construction, for instance, made of light-weight metal such as aluminum and provided with hinges, where desired to enable lowering thereof. Alternatively, the side walls may be formed of several parts so as to be slidable over each other in the direction of the plane thereof.

While I have shown a preferred embodiment of my invention, it is understood that the same is not limited thereto but is susceptible of many changes and modifications within the spirit and scope of the present invention, and I, therefore, intend to cover all such changes and modifications as encompassed by the appended claims.

I claim:

A commercial motor vehicle having a relatively large loading platform, an engine located below said platform, a driver cab located above said loading platform, support column means for said driver cab including a supporting post of relatively small cross-sectional area compared to said platform, said supporting post having a relatively small dimension in the transverse direction of the vehicle as compared to the dimension thereof in the longitudinal direction of the vehicle, and a superstructure for said loading platform including side walls and upright pillar means, said supporting post and said upright pillar means being arranged essentially in the central longitudinal plane of the vehicle, said upright pillar means including two pillars arranged adjacent opposite ends of said platform, said pillars having a generally rectangular shape and a relatively small cross-sectional area as compared to said platform and extending longitudinally of the vehicle, the dimension of said pillars in the transverse direction of the vehicle being larger than the dimension of said supporting post in the same direction.

References Cited in the file of this patent

UNITED STATES PATENTS

| | | |
|---|---|---|
| 740,350 | Yetter | Sept. 29, 1903 |
| 1,044,266 | Seereiter | Nov. 12, 1912 |
| 1,425,596 | Kramer | Aug. 15, 1922 |
| 2,457,400 | Roos | Dec. 28, 1948 |
| 2,474,094 | Colquitt | June 21, 1949 |
| 2,490,162 | Ruelle | Dec. 6, 1949 |
| 2,750,225 | Mettetal | June 12, 1956 |
| 2,757,039 | Merriman | July 31, 1956 |

FOREIGN PATENTS

| | | |
|---|---|---|
| 874,108 | Germany | Apr. 20, 1953 |